Feb. 2, 1954

J. M. CARRIS ET AL 2,667,847

MACHINE FOR FORMING AND PREPARING
BODIES OF CANDY FOR WRAPPING

Filed May 25, 1949

INVENTORS:
JAMES M. CARRIS,
CLARENCE L. CRANE,
BY

*Wilfred L. Lawson*
ATTORNEY.

Fig. 2

JAMES M. CARRIS,
CLARENCE L. CRANE,
INVENTORS,

BY

ATTORNEY.

Patented Feb. 2, 1954

2,667,847

UNITED STATES PATENT OFFICE 2,667,847

MACHINE FOR FORMING AND PREPARING BODIES OF CANDY FOR WRAPPING

James M. Carris and Clarence L. Crane, La Habra, Calif., assignors, by mesne assignments, to said James M. Carris Application May 25, 1949, Serial No. 95,228

13 Claims. (Cl. 107—8)

This invention relates generally to the art of candy manufacture and is directed particularly to improvements in machines for forming and preparing bodies of candy for wrapping.

A particular object of the present invention is to provide a candy manufacturing machine for making candy units or pieces in any arbitrary form or shape and mounting the same on suitable handles, such as a stick, by means of which they may be held while being consumed and the present machine is particularly designed to manufacture candies of the type commonly known as "suckers."

Another object of the invention is to provide a machine of the character stated wherein a number of units are provided, each of which is designed to perform a particular function with means operatively coupling all of the units so that they will be organized or correlated for synchronous operation to cut, shape, mount on the handle or carrier and remove, successive candy bodies ready for wrapping.

A still further object of the invention is to provide in a machine of the character stated, a novel feed means for molding and advancing a mass of candy in the form of a stick or rod, to a cutter for division into units of prescribed size, with means for effecting such feeding in steps or intermittently and means for advancing or feeding the candy in a prescribed quantity.

Still another object of the invention is to provide in association with the candy feeding means, an intermittently operated scissors type cutter for separating the stick or rod of candy material into units of desired size.

A still further object of the invention is to provide in a machine of the character stated a novel mechanism for supplying from a hopper, individual sticks or handles in the required timed sequence and forcing such handles into the candy unit simultaneously with the compression and molding of the unit to the desired form.

Still another object of the invention is to provide in a machine of the character stated a mechanism for effectively removing the formed candy body with the handle or carrier stick from the molding mechanism immediately upon completion of the operation of forming the body and fixing the carrier stick or handle therein.

A still further object of the invention is to provide in a machine of the character stated a means for bringing together cut candy pieces and carrier sticks automatically and in proper timed relation at a molding station to effect the molding of the piece and the introduction of an end of a stick thereinto entirely mechanically, and subsequently mechanically removing the completed candy ready for wrapping.

Still another object of the invention is to provide in a machine of the character stated, a means for insuring the single feeding of carrier sticks or handles from a supply hopper.

Still another object of the invention is to provide in a machine of the character stated, a novel mechanism for thrusting a stick or handle endwise into the candy mass while the latter is being molded and for holding the stick in such a manner during the operation as to prevent the stick from buckling or breaking.

A still further object of the invention is to provide in a machine of the character stated, a means for removing from the machine, or from position ready for advancement into the candy molding part thereof, the stick or handle in the event that the mold chamber fails to receive a candy piece.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

Figure 1:
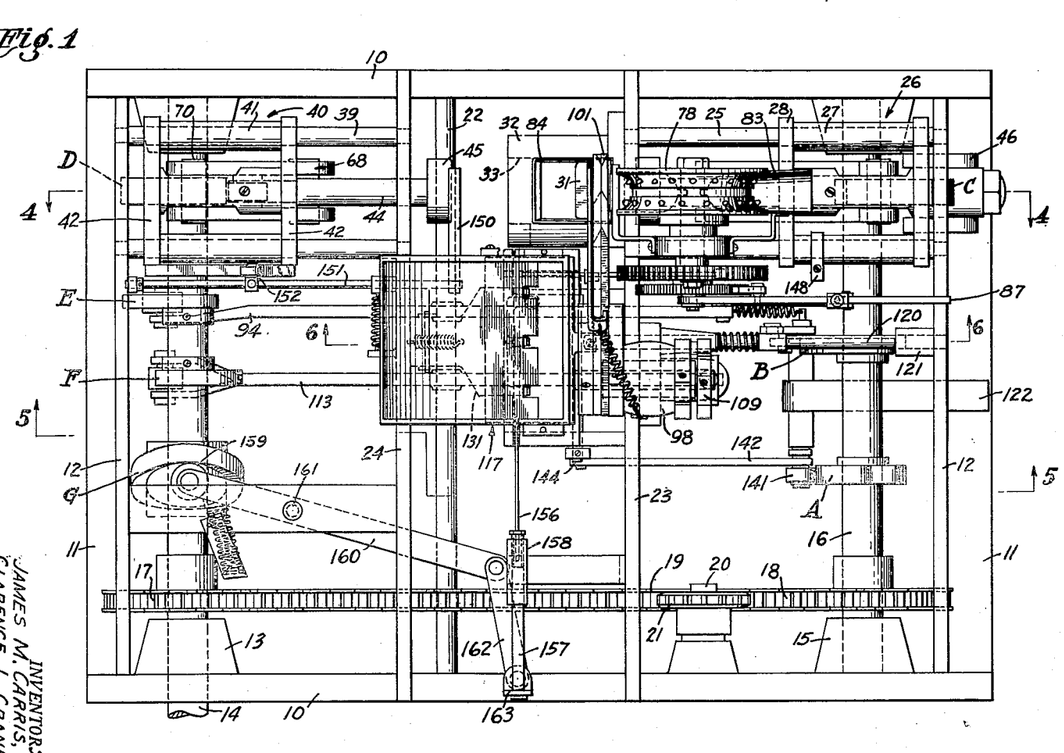
Figure 1 is a view in top plan of a candy manufacturing machine constructed in accordance with an embodiment of the present invention.

Referring now more particularly to the drawings it will be seen upon reference particularly to Figure 1 that the machine of the present invention is of generally rectangular form and in its simplest embodiment comprises the two upright side walls 10 which are connected at opposite ends by the transverse bottom foot plates 11 and, adjacent to their top edges, by the transverse end wall plates 12.

It will be understood, of course, that the frame structure herein disclosed is shown more or less in skeleton form and might be modified in various ways in the machine as actually produced, without departing from the spirit of the invention.

At one end of the machine the side walls carry the inwardly extending bearing bosses or hubs 13 which support the transversely extending shaft 14 which is here designated the drive shaft.

At the opposite end of the machine the side walls 10 carry similar inwardly extending bearings 15 between which is rotatably supported the transverse shaft 16 which will be, for convenience in distinguishing between the shafts, referred to as the driven shaft.

It is understood that while the shaft 14 may be referred to as the drive shaft and the shaft 16 as the driven shaft the invention is not limited in this respect since either shaft may be used for receiving and transmitting power to the other shaft through suitable connecting mechanism between the shafts.

In the structure here illustrated each of the shafts carries a sprocket gear, the gear on the shaft 14 being designated 17 and that on the shaft 16 being designated 18. The sprocket gears are connected by a driving chain 19.

Mounted upon a suitable stub shaft 20 which is rotatably supported upon the adjacent side wall 10, is an idler wheel 21 which engages the top run of the sprocket chain to maintain the latter at the proper tension.

Extending transversely of the machine between the two shafts and in parallel relation therewith is a fixed or non-rotating shaft 22 the purpose of which will be hereinafter brought out.

Figure 5:
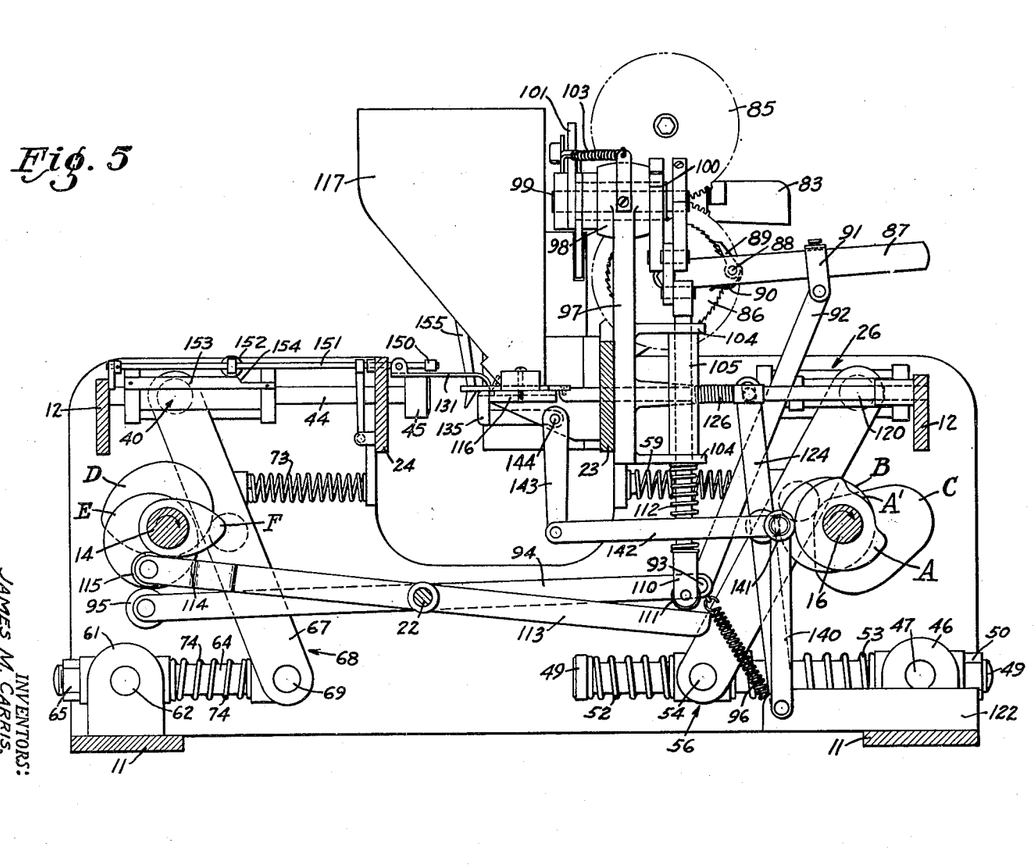
Figure 5 is a longitudinal section on a vertical plane taken substantially on the line 5—5 of Figure 1 and looking in the direction of the arrows or oppositely to the direction of the preceding figure.
Figure 6:
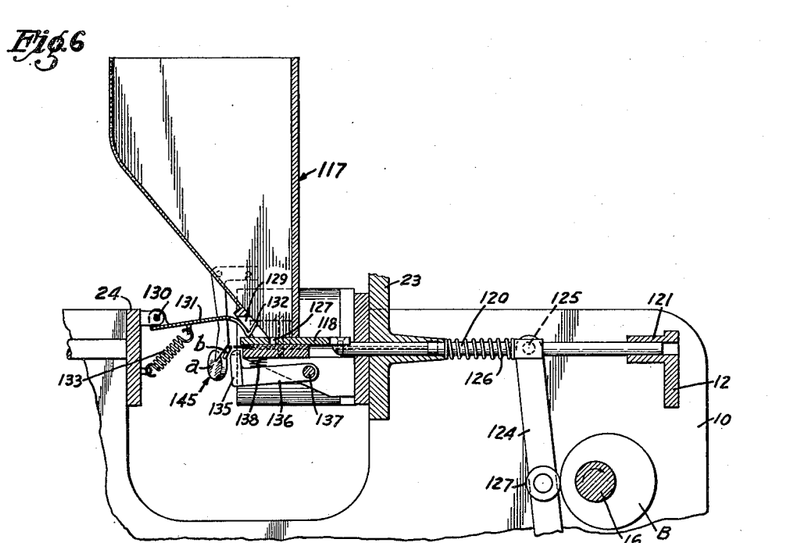
Figure 6 is a detail section taken on a vertical plane longitudinally of the machine substantially on the line 6—6 of Figure 1.

In addition to the end wall plates 12, there extend across the machine between the side walls 10 two inner wall plates 23 and 24 which parallel the plates 12 as is clearly shown in Figures 5 and 6.

Adjacent to one side of the machine there are supported between the inner wall plate 23 and the end wall plate 12 the two spaced ways 25 which extend longitudinally of the machine and upon which is mounted for sliding movement, a cross head unit which is generally designated 26. This cross head unit comprises the two sleeves 27 each of which has one of the ways 25 extending therethrough, and the cross connecting bars 28 between the sleeves so that there is thus formed a substantially rectangular frame which is adapted to move back and forth on the ways 25 in the manner hereinafter described.

Figure 4:
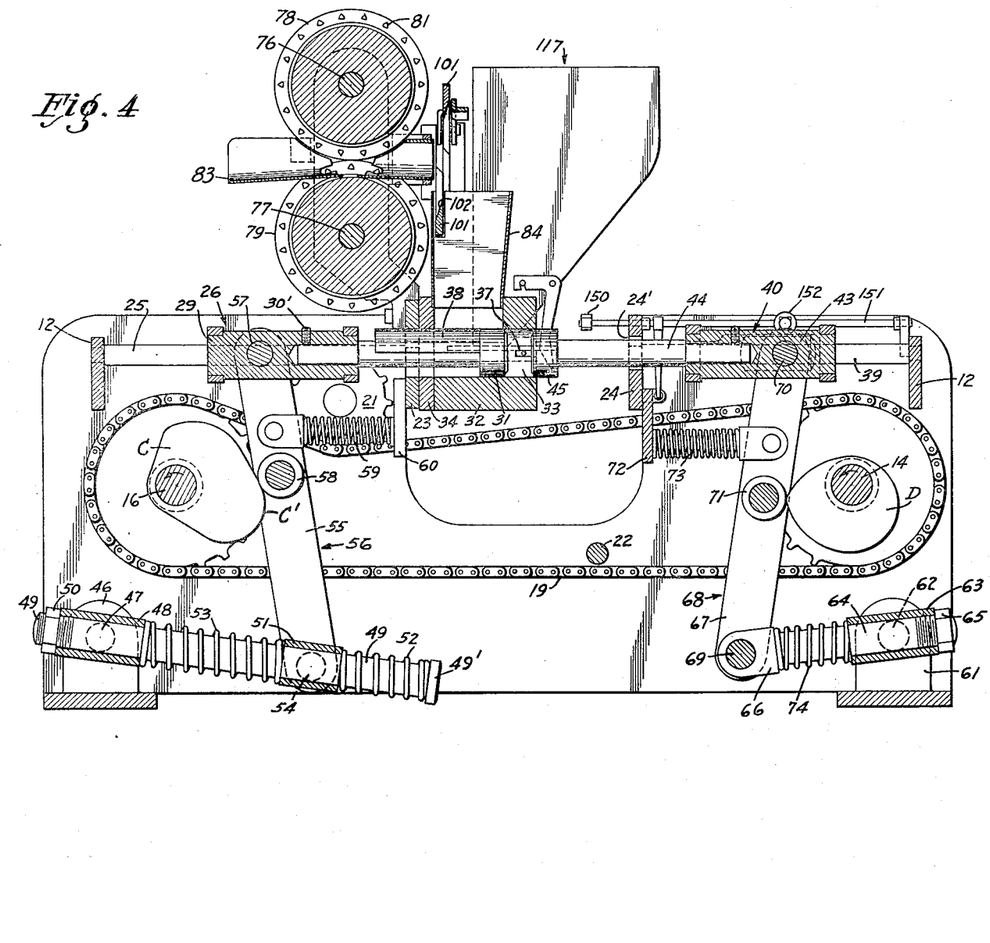
Figure 4 is a longitudinal section on a vertical plane taken substantially on the line 4—4 of Figure 1 and looking in the direction indicated by the arrows.

Mounted between the cross bars 28 and extending transversely thereof parallel with the sleeves 27 is a body 29 which carries upon the inner end a stem 30 which carries upon its forward end a molding ram head 31. This stem 30 may be removably secured in the carrying body 29 by a set screw 30' as shown in Figure 4.

Positioned between the inner wall plates 23 and 24 and secured to the plate 23 in line with the ram head 31 is the mold block 32. This mold block has a chamber 33 formed therein in which the head 31 is slidably positioned and the adjacent wall plate 23 and the backing plate 34 which forms a part of the mold block have aligned openings therethrough for the extension of the stem 30 as shown in Figures 4 and 7.

Figure 7:
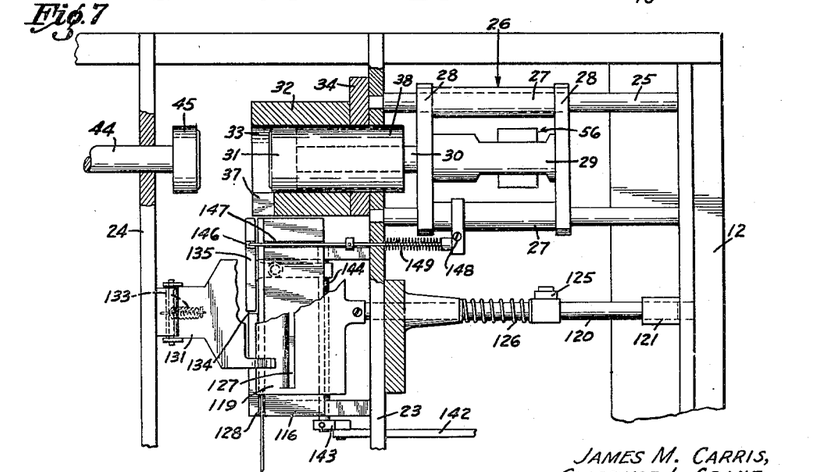
Figure 7 is a detail view partly in top plan and partly in section of the stick feeding and ejecting mechanism and the adjacent parts of the molding mechanism.

The top of the mold block 32 has formed therein an entrance opening 36 through which candy pieces pass into the mold chamber as hereinafter described and upon the inner side of the mold block there is formed the stick slot 37 which opens into the chamber and through the forward edge of the block as shown in Figure 7, for the purpose hereinafter described.

Carried by the head 31 upon the back part thereof and extending rearwardly in shielding position over the stem 30, is the transversely arcuate shield 38 which slides along the top wall of the mold chamber and covers the candy entrance opening 37 during the operation of molding by compression a candy piece which has been introduced into the chamber. The function of this shield plate will be more readily understood in the following description of the operation of the machine.

As will be readily seen upon reference to Figure 4 the end of the mold chamber remote from the cross head 26 is open and faces and is spaced from the wall plate 24.

Directly opposite the mold block 32 the wall plate 24 has an opening 24' therethrough which is coaxial with the ram head 31 and supported between the wall plate 24 and the adjacent end wall plate 12 are the two spaced parallel ways 39 of the same character as the ways 25, upon which is slidably mounted for reciprocatory movement, a cross head unit which is generally designated 40 and which comprises two sleeves 41 each of which slides on a way 39, and two cross bars 42 connecting and carried by the ends of the sleeves.

Mounted between the cross bars 42 is a body 43 corresponding to the body 29, in the inner end of which is formed a suitable bore to receive an end of the stem 44 which carries a die head 45 of similar form to the ram head 31. This die head is of proper form or design to move smoothly into the open end of the mold chamber 33 as shown in Figure 4 to cooperate with the head 31 in compressing a body of candy in the chamber. The end of the chamber into which the head 45 enters also constitutes the outlet or discharge opening for the molded candy body as hereinafter set forth.

The heads 31 and 45 are designed to move in proper sequence together by means of the following mechanism.

Reference will first be had to shaft 16, upon which are mounted three cams designated respectively A, B and C. These cams will be referred to respectively as the stick gate cam (cam A), the stick plate cam (cam B) and the ram head cam (cam C).

Upon the other shaft, shaft 14, are also a number of cams designated D, E, F and G. These cams will be referred to respectively as the die cam (cam D), the candy feed cam (cam E), the cutter operating cam (cam F) and the stick or wobble cam (cam G).

Upon the foot plate 11 below the cross head 26 is a pair of upstanding ears 46 between which is supported for rocking movement on trunnions 47, a guide sleeve 48. Slidably extended through the sleeve 48 is a long pin 49 which carries upon its outer end the movement limiting nut 50. The major portion of the pin 49 extends inwardly as shown in Figure 4 and carries a collar 51. Upon the two sides of the collar 51 are springs 52 and 53. The spring 53 is held between the sleeve 48 and the collar and the spring 52 is held between the collar and the head 49' of the pin.

The collar 51 carries the oppositely extending trunnions 54 with which are pivotally connected the lower ends of the two long spaced members 55 which are joined together to form a rock arm which is generally designated 56. The upper ends of the members 55 receive between them the body 29 of the cross head 26 and are pivotally connected to that body by the transverse pin 57.

Rotatably supported between the members 55, at the proper elevation with respect to the ram head cam C is a roller 58 which is in line with the cam C and adapted to be engaged by the same. The engagement of the cam follower roller 58 with the cam C is constantly maintained and the outward movement of the ram head 31 is constantly urged by a spring 59 which is interposed between and connected with the thrust lever and the adjacent thrust plate 60 carried by the wall plate 23.

At the opposite end of the machine and in line with the upstanding gears 46 is a similar pair of gears 61 supported upon the adjacent foot plate and having mounted therebetween by means of trunnions 62, a guide sleeve 63 through which slidably extends an end of a pin 64. The outer end of the pin is provided with the nut 65 which limits the inward movement of the pin and at the inner end the pin carries a head 66 which is positioned between a pair of upright members 67 which together form a second thrust lever which is generally designated 68, the members being connected with the head 66 by the pivot pin 69.

The upper ends of the members 67 receive between them the body 43 of the adjacent reciprocable cross head 40, to which body the members are pivotally connected by the pin 70.

Pivotally supported between the members 67 is a cam follower roller 71 which is in line with and constantly contacted by the die cam D.

Connected with the thrust lever 68 and interposed between it and a plate 72 carried by the adjacent wall plate 24, is a spring 73 which constantly urges outward movement of the upper end of the lever 68 and retraction of the die head 45 from the die chamber.

The lower end of the thrust lever 68 is constantly urged inwardly by a spring 74 which is interposed between the head 66 and the guide sleeve 63 as shown and this spring and the springs 52 and 53, also function as cushions or shock absorbers for the levers and further provide for necessary play if the associated cams tend to urge closing movement of the ram heads beyond what is possible by reason of the candy mass between them.

Mounted upon the inner wall plate 23 in line with one side of the cross head unit 26 is a standard 75 which carries in vertically spaced relation the parallel upper and lower shafts 76 and 77 respectively. These shafts support upper and lower feed wheels 78 and 79 respectively, each of which wheels is provided with the peripheral channel or groove 80. Each of these grooves or channels carries the two sets of inwardly projecting pins or spurs 81 which function to grip a candy mass passing between the wheels to advance it as desired.

Figure 3:
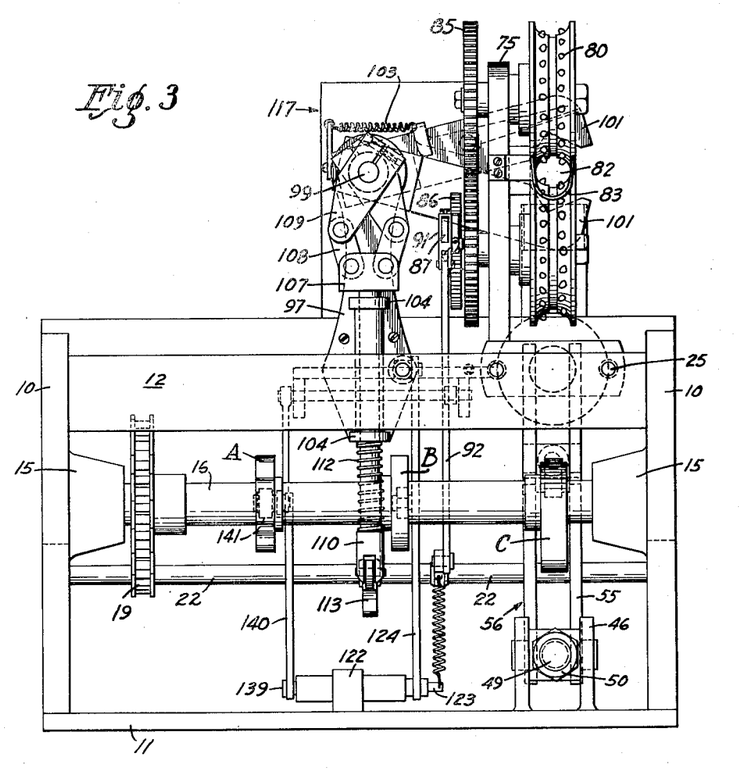
Figure 3 is a view in elevation of the end of the machine adjacent to and looking toward the candy feeding and cutting mechanism.

As shown in Figure 3 the peripheries of the wheels 78 and 79 are substantially in contact so that the channels of the wheels form a more or less circular opening 82 through which the candy mass is moved and by which it is formed into a rod or stick.

Supported upon the standard 75 is a candy trough which, as shown in Figure 4, is suitably separated into two portions to fit into the bight between the candy feed wheels 78 and 79 and as shown in Figure 4 the outlet end of this trough terminates above one side of a vertically positioned chute 84, the lower end of which is fixed in the upper part of the inlet opening 37 leading to the mold chamber 33.

Each of the shafts 76 and 77 carries a gear 85, which gears are meshed one with the other and the lower shaft 77 in addition carries a ratchet wheel or gear 86.

Pivoted at one end for free rocking movement in a vertical plane upon the lower shaft 77, is a pawl carrying arm 87. This arm carries a pin 88 upon which is pivotally mounted a pawl 89 which has engagement with the adjacent ratchet wheel and is constantly urged into contact therewith by a spring 90.

Upon the pawl arm 87 is mounted for sliding adjustment longitudinally thereof the yoke 91, with which is pivotally connected one end of a relatively long operating or thrust link 92.

The opposite or lower end of the link 92 is pivotally connected as at 93 with a horizontal rock lever 94 which is pivotally mounted substantially midway between its ends, upon the fixed shaft 22. The opposite end of the lever 94 carries the cam follower roller 95 which is contacted by the periphery of the candy feed cam E.

A spring 96 is connected at one end with the pivot 93 between the rock lever 94 and link 92 and constantly urges downward movement of the link, the opposite end of the spring being secured to a fixed part of the machine frame.

Figure 2:
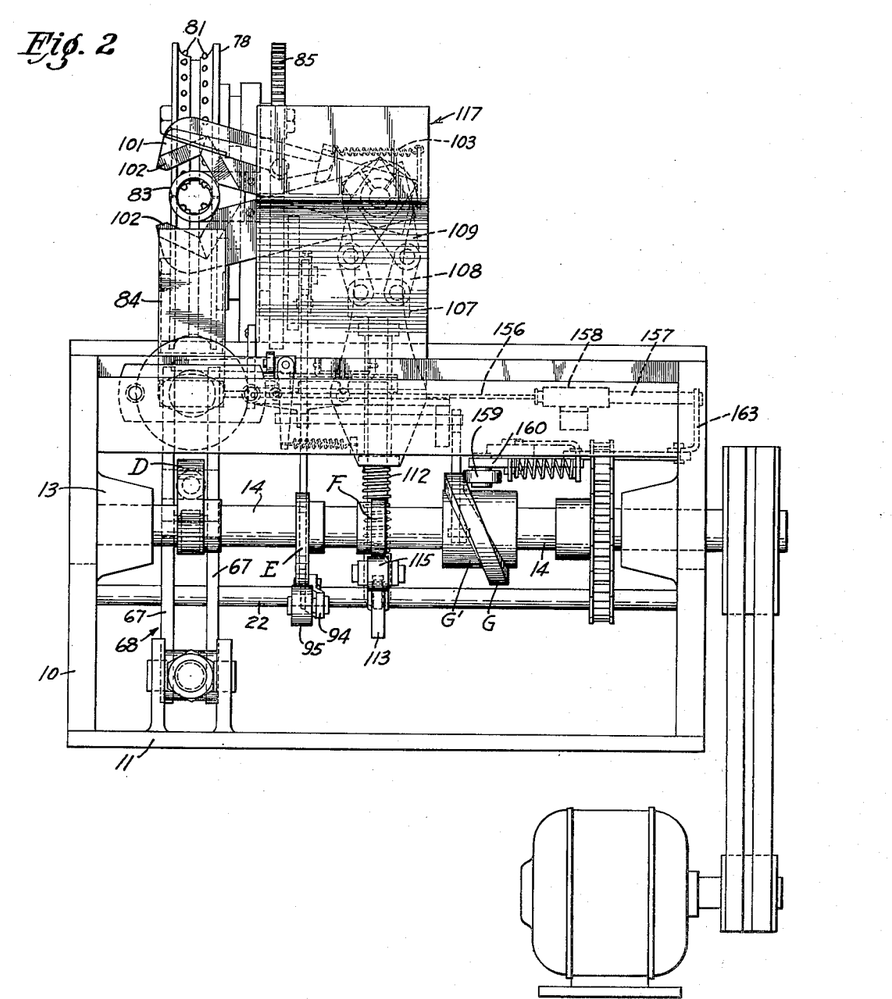
Figure 2 is a view in elevation of the end of the machine remote from the candy feeding and cutting mechanism.

Fixed to the inner wall plate 23 adjacent to the feed wheel gears 85 is a plate or standard 97. This standard carries upon its upper end the bearing head 98 in which is mounted for turning movement the knife shaft 99. Also extending through the bearing head 98 and having the shaft 99 passing therethrough, is a bearing sleeve 100. A pair of knives, each of which is designated 101, is supported by the shaft and sleeve 99—100 for relative movement in scissors fashion as will be readily apparent upon reference to Figures 2 and 3. As will be readily seen one knife is fixed to the end of the shaft 99 and the other knife is fixed to the adjacent end of the sleeve 100 and the knives extend laterally across the outlet end of the feed chute 83. The outer ends of the knives are provided with the V-shaped cutting edges 102 which come together upon opposite sides of a roll or stick of candy material issuing from the outlet end of the chute 83 to cut off a section of the same, which cut off section or piece drops down into the chute 84 to pass into the die chamber 33.

A spring 103 connects the top of the upper one of the knives 101 with an adjacent fixed part of the machine and normally urges the upper knife to swing upwardly, the other or lower knife moving downwardly by gravity so that the knives are normally separated at their cutting edges as shown in Figure 3.

The standard 97 carries a pair of arms 104 between which is held a guide sleeve 105 and through this guide sleeve extends a vertically reciprocating pin or rod 106. The upper end of this rod carries a head 107, see Figure 3, with which are pivotally connected two short upwardly extending links 108. Each of these short links 108 is pivotally connected with an end of a downwardly extending crank arm 109. One of these crank arms 109 is fixed to the adjacent end of the shaft 99 while the other crank arm 109 is fixed to the adjacent end of the sleeve 100. The arms 109 extend downwardly in divergent relation as shown in Figure 3, the associated links 108 being extended upwardly and outwardly and accordingly it will be readily apparent that upon upward movement of the pin or rod 106 the arms will be oscillated oppositely so as to turn the shaft in one direction and the sleeve in the opposite direction and accordingly bring the cutting edges of the knives into coacting or crossing relation across the path of movement of a stick or rod of candy material issuing from the guide trough 83.

The lower end of the rod 106 has a head 110 fixed thereto which carries a roller 111. Interposed between this head 110 and the lowermost arm 104 is a spring 112 which normally pulls down upon the rod and thus assists gravity and the spring 103 in maintaining the knives separated.

Mounted upon the stationary shaft 22 is a rock lever 113 which has one end positioned beneath and in contact with the roller 111 while the opposite end of this lever is bifurcated as indicated at 114 and carries rotatably between the furcations a cam follower roller 115 which has contact with and is actuated by the cutter cam F.

At the inner side of the mold block 32 there is supported by and in spaced relation with the inner wall plate 23 a table 116.

Mounted above the table 116 is a hopper which is generally designated 117 and which is designed to carry a supply of sticks suitable for use in supporting the candy body. The lower end of this hopper is constricted as shown in Figure 6 to provide the outlet end 118 which is in spaced relation with the top of the table.

Supported for sliding movement on the table 116 across the outlet 118 of the stick hopper, is the stick feed plate 119 which has connected with it the outwardly extending rod 120, the extreme outer end of which is supported in a guide sleeve 121.

Disposed beneath the adjacent shaft 16 is a fixed arm 122 which carries a laterally extending pivot pin 123 on which is mounted the lower end of a rocker arm 124. This rocker arm extends upwardly across the rod 120 and is pivotally connected therewith as at 125. Interposed between the connection 125 and the adjacent part of the wall plate 23 through which the rod 120 passes is the spring 126.

The rocker lever 124 carries a cam follower roller 127 which is contacted by the stick plate cam B as shown in Figure 6.

The stick plate 119 has formed therein a slot 127 which is adapted to receive a single stick from the hopper and move it toward the inner edge of the table 116 where it is received in a stick groove 128 which is aligned with the slot 37 in the adjacent mold block 32.

The wall of the hopper 117 nearest to the groove 128 slopes downwardly and inwardly and is provided with a number of recesses 127 and pivotally mounted adjacent to this slotted wall of the hopper, upon the transverse wall plate 24, as indicated at 130, is a stick press down plate 131. This plate has three or any desired number, of substantially V-shaped fingers 132, each of which engages or positions in a slot 129 and the lower portions of these fingers are arranged to press downwardly upon a stick which has been shifted into the groove 128 by the forwardly moving plate 118, after which the plate moves back to cover the stick and hold it against buckling. The fingers ride back onto the plate 118 as shown in Figure 6 and the plate overlying the stick in the groove prevents it from buckling or breaking as stated as the stick is being forced longitudinally into the candy mass.

A spring 133 is connected between the lower part of the plate 131 and the adjacent wall 24 and constantly pulls down on the plate so that the stick holding fingers will be pressed firmly against a stick until the plate shifts back as described.

The table 116 has formed in the inner edge thereof the recess 134 in which is positioned a gate 135 which lies parallel with and forms one side of the groove 128. This gate is carried by an arm 136 which is pivoted at 137 as shown in Figure 6 and is normally urged downwardly by a spring 138. When this gate is down the side of the groove 128 next to the mold block is uncovered so that the stick which has been inserted into the candy mass in the mold chamber, can be ejected.

The gate 135 is maintained in raised position during the desired period of operation of the machine by the stick gate cam A in the following manner. A pivot pin 139 supported on the arm 122 has mounted thereon the upstanding rocker arm 140, the upper end of which carries the cam follower roller 141 as shown in Figure 5. Pivotally connected with the upper end of the arm 140 is an end of a link 142, the opposite end of which is pivotally connected to a depending crank arm 143 which is secured to an end of the rock shaft 144. This rock shaft 144 is supported as shown in Figure 6 by the underpart of the table structure 116. The rock shaft 144 is connected with the gate arm 136 as shown in Figure 7 and it will accordingly be apparent that raising and lowering movement of the gate 135 will be effected by the action of the cam A.

Figure 6 shows a finished candy being ejected from the machine, this piece of candy is generally designated 145 and as shown comprises the candy body $a$ and the stick $b$ which is fixed in the body.

In order to insure the removal of the stick from the groove 128 at the end thereof which is closed on one side by the gate 135, use is made of the reciprocating finger 146 which slides across the table in a groove 147, which groove extends across the gate 135 as shown. This ejector finger 146 is attached to the adjacent sliding cross head 26 as indicated at 148. This connection may be a fixed one or it may be merely in the form of a pusher connection or pusher finger and in the latter case a spring 149 would be employed to effect the outward or retracting movement of the ejector finger as the cross head moves back.

In addition to the finger 146 for kicking out the stick, means is also provided for knocking the head of the candy piece $a$ off from the die head 45 if it should stick thereto, by means of an arm 150 which is supported upon a rock shaft 151 to swing across the face of the die head when the latter is in retracted position as shown in Figure 1.

The rock shaft 151 has fixed thereon a roller 152 and the adjacent reciprocable cross head 40 carries a cam bar 153 upon the top of which the roller 152 engages. This cam bar has the sloping cam shoulder 154 which, when brought into engagement with the roller 152 lifts the roller and rocks the rock shaft 151 to swing the knock out arm 150 downwardly.

In addition to the foregoing, in order to insure the direct dropping of the finished candy there is provided the check finger 155 which is carried by a side of the stick hopper 117 and extends downwardly in the path of the stick b, as shown in Figure 6 so as to cause all of the candy pieces to drop in the same position.

The projection of the candy stick along the groove 128 of the table and through the slot 37 into the candy mass in the molding chamber 33, is effected by means of a reciprocating wand 156 which is attached to a rod 157 which, in turn, is slidably supported in a guide sleeve 158. This sleeve is aligned with the groove 128, as is readily seen in Figure 1 the forward end of the wand 156 normally lies in the groove and the candy stick is deposited in the groove in advance of the wand by the stick plate 119.

Upon the shaft 14 is mounted the cam G which is in the form of a plate or flange which encircles a collar G' and lies in a plane oblique to the shaft. This cam plate or flange is engaged in one side face by a follower roller 159 which is carried upon an end of a rock arm 160 which is pivotally mounted intermediate its ends as indicated at 161. The other end of this rock arm is pivotally connected to an end of a pull link 162 which is joined to the outer end of the rod 157 by means of the upstanding coupling bracket 163.

Figure 5 illustrates the relative positions of all of the cams, with the exception of the cam G. As will be readily apparent upon reference to this figure and also to Figure 1 it will be seen that the parts of the machine, except for the shafts 14 and 16 and the cams carried thereby, are substantially in static position, in which position the mold or ram heads 31 and 45 are at approximately their fully separated positions or possibly a little short of such positions since the head 45 is beginning to return from its fully retracted position.

It will also be seen that the cam roller 152 for the knock off arm 150 has been returned to the high part of the cam bar 153 so that the knock off arm 150 remains in the position shown until another candy sucker has been fixed to its carrier stick.

Referring more particularly to the cams in the order in which they have been described, cam A which operates the stick gate is shown in Figure 5 in its dwell position where the stick gate 135 is held elevated. When this cam rotates to the proper extent it will bring around for engagement with the follower roller 141, the low part A' which permits the arm 140 to swing to the right and cause the gate spring 138 to lower the gate.

The plate cam B is shown in the position in which it has forced the lever 124 forwardly so as to move the stick plate 116 to the left, to the opposite position from that in which it is shown in Figure 6. Thus the stick plate in the position shown in Figure 5 has shifted to a position where the slot 127 has been located beneath the points of the stick hold down fingers 132 and a stick has accordingly been shifted from the hopper 117 into the groove 128 as shown in Figure 7.

The cam C which operates the ram 31 which moves in the die chamber 33, is in a dwell position, the ram 31 being fully retracted in the die chamber so as to permit a piece of candy cut from a stick fed through the trough 83, to drop down through the opening 37 into the die chamber in front of the die head or ram head.

The coacting cam D which operates the other die 45 is, as shown in Figure 5, at this moment starting on its working or thrust movement to move the die 45 into the outlet opening of the die chamber.

Cam E which operates the candy feed wheels 78 and 79 through the medium of the pawl and ratchet 86—89 is just completing its thrust movement against the rock lever 94 so that the pawl 89 is on its reverse movement in preparation for another advance of the feed wheels. It will accordingly be understood that the candy in the form of a stick has been shifted forwardly by the feed wheels 78—79 and has its forward end projecting between the cutting edges of the knives 101 preparatory to being cut off in the proper length.

The cutter operating cam F is now advancing on its work movement preparatory to the forcing down of the adjacent end of the rock lever 113 so as to effect the closing of the cutting knives on the projecting end of the candy stick which has just been moved forwardly under the action of the cam E.

It will be recalled that the ram head 31 is in fully retracted position at this time and as soon as the candy piece is cut it will fall down through the chute 84 into the die chamber 33 at the front end of the head 31. The cam C will then begin to return the head 31 to meet the advancing die head 45, the movement of which is slightly in advance of the movement of the head 31 so that the die 45 will be in the outlet end of the die chamber in sufficient time to prevent any part of the candy being forced from the chamber.

Upon reference to Figure 1 it will be seen that the cam G which effects the projection of the stick into the candy mass is in the dwell position where the stick projector wand 156 is fully retracted, as would, of course, be required to permit the hereinbefore described forward movement of the plate 119.

Figure 4 illustrates the positions of the cams C and D when the die heads 31 and 45 have been moved together to the maximum extent. It will be seen that the cam D is in full thrust position and on the point of permitting the head 45 to start moving rearwardly or reversely whereas the cam C has still to bring its highest point C' into effective operation against the follower 58 whereby to continue the advance movement of the ram head 31. Thus it will be seen that for a short period of time the two ram heads will move in the same direction, that is, the head 31 continuing to advance while the head 45 moves back away from it.

When the cam D has reached the position shown in Figure 4 or its full thrust position, the stick projecting cam G will have turned approximately to the necessary extent to effect the forward movement of the wand 156. This will bring about the longitudinal movement of the stick in the groove 128, forcing the forward end of the stick through the slot 37 of the die block 32 and into the candy mass held between the heads 31—45.

It is to be noted that at this time when the stick is forced into the candy mass the die head 31 has not moved forwardly to its fullest extent and accordingly the kick out finger 146, shown in Figure 7 will not have advanced to the position in which it is shown in this figure but will have its forward end back from the stick groove so that the stick can be projected as stated.

After the stick has been projected into the candy the stick gate operating cam A will be rotated to the point where the low part A' of its periphery will be in contact with the follower roller 141 thereby allowing the gate 135 to drop down as shown in Figure 6 and following this movement of the gate the kick out finger 146 engages the stick of the candy piece to shift it from the guide groove while the still forwardly moving head 31 pushes the molded candy piece from the die chamber 33.

In the event that the candy piece sticks to the face of the head 45 then, of course, the candy and the stick will be moved with this head and when the head 45 reaches the limit of its retracting movement the cam roller 52 will drop down to the low point or low portion of the cam track 153 and cause the knock out arm 150 to move across the face of the ram head 45 and knock the candy body loose therefrom.

By the provision of the arcuate shield 38 the entrance of a piece of candy into the chamber 33 behind the head 31 is prevented in the event that the candy piece is cut and drops through the chute 84 before the head 31 has moved back or if the mechanism is set so as to cut the pieces while the head is in its fully advanced position as shown in Figure 4.

From the foregoing it will be readily appreciated that there is provided in the present invention a novel machine for carrying out in proper sequence the several operations of feeding the candy material in stick form to a cutter, cutting off a piece of the desired length and causing such piece to move into proper position in a press or mold chamber and then automatically performing the several operations of molding the candy piece in the desired shape, introducing the carrier stick thereinto and removing it from the mold and from between the dies.

We claim:

1. A candy machine of the character described, comprising a body having an elongate horizontally disposed cylindrical mold chamber, said chamber having one end open for the discharge of a molded candy piece therefrom, said body having an inlet opening leading into the chamber through the top thereof at a position inwardly from said one end, a pair of relatively movable compressing dies, one of said dies being in the chamber and the other die being movable through the discharge opening into said chamber toward the said one die to press mold a body of candy in the chamber, means for supporting a stick handle for movement along a path extending transversely of the chamber, means for moving the handle lengthwise, means whereby an end of a handle may be introduced into a candy body in the chamber, means for removing the candy body and handle from the chamber upon separation of the dies, and means for knocking the candy body free from the said other die when the latter has moved out of the chamber.

2. A candy machine of the character described, comprising a cylindrical mold chamber, a die head reciprocable therein, the chamber having an outlet, a second die head mounted for reciprocable movement in aligned relation with the first head, the second die head being movable from a position outside the chamber to a position within the chamber through said outlet for coaction with the first head, means for introducing a candy body into the chamber between the heads, said mold chamber having a side opening for introducing a handle stick into the candy body in the chamber, a thrust element operatively coupled with each of said heads, a rotatable cam operatively connected to each thrust element to impart movement thereto and to the head connected therewith, and means for turning the cams simultaneously, said rotatable cams being formed and positioned relatively to one another to first move the heads together in the mold chamber to press mold the candy body therein and then reversely move the second die head while continuing the initial movement of the first die head toward said outlet to effect ejection of the molded body from the chamber.

3. A candy machine of the character stated in claim 2, wherein said mold chamber is horizontally disposed and has an inlet opening above the first die head by which the candy body is introduced from above into the chamber in front of the die head, said first die head moving across the inlet opening upon the press stroke, and means carried by the first die head for covering the inlet opening upon the movement of the first die head on the said press stroke.

4. A candy machine of the character stated comprising a mold chamber, a die head reciprocable therein, an operating cam operatively connected with the die head to effect its forcible forward movement on a mold stroke, the mold chamber having an outlet opening at the end thereof toward which the die head moves on its mold stroke, a second die head, means supporting the second die head for movement into the chamber through the outlet opening for press molding cooperation with the first head in the chamber, an operating cam connected with the said supporting means for the second die head to effect the movement of the latter into the chamber, means for effecting the reverse movement of each of the die heads for the separation of the same, means for introducing a candy body into the chamber between the die heads, and means for facilitating the introduction of a handle stick into the mold chamber from one side thereof for penetration into a candy body the said operating cam for the second die head being constructed and arranged to effect the reverse movement of the second die head from the mold chamber following the press molding operation and prior to the completion of the forward movement of the first die head under the action of the first mentioned cam whereby the first mentioned die head functions to eject the molded candy body from the outlet opening.

5. A candy machine of the character stated comprising a mold chamber, a die head reciprocable therein, an operating cam operatively connected with the die head to effect its forcible forward movement on a mold stroke, the mold chamber having an outlet opening at the end thereof toward which the die head moves on its mold stroke, a second die head, means supporting the second die head for movement into the chamber through the outlet opening for press molding cooperation with the first head in the chamber, an operating cam connected with the said supporting means for the second die head to effect the movement of the latter into the chamber, means for effecting the reverse movement of each of the die heads for the separation of the same, means for introducing a candy body into the chamber between the die heads, and means for facilitating the introduction of a handle stick into the mold chamber from one side thereof for penetration into a candy body the said operating cam for the second die head being constructed and arranged to effect the reverse movement of the second die head from the mold chamber following the press molding operation and prior to the completion of the forward movement of the first die head under the action of the first mentioned cam whereby the first mentioned die head functions to eject the molded candy body from the outlet opening, and a kick-out means adjacent to said outlet opening for engaging the stick handle to effect the removal of the molded candy body from the chamber in cooperation with the ejecting movement of the first head.

6. A candy machine of the character stated, comprising a mold block having a relatively long mold chamber therein, said chamber having one end open to provide an outlet for a molded candy body, a die head mounted within the chamber for reciprocatory movement relative to the outlet opening, a reciprocable cross head connected with the die head, a lever having a pivot fulcrum at one end and having its other end connected with the cross head, means normally urging oscillation of the lever in a direction to move the die head away from the outlet opening of the chamber, a rotary cam operatively connected with the lever and adapted to move the cross head to shift the die head toward said outlet opening, a second die head, a second cross head having the second die head connected therewith for reciprocating the latter in line with the first die head, the second die head being adapted to enter the mold chamber through said outlet opening for press molding coaction with the first die head, a second lever having a pivot fulcrum mounting for one end and having its other end pivotally connected with the second cross head, means normally urging movement of the second lever in a direction to shift the second cross head and the second die head away from the mold chamber, a cam means operatively coupled with the second lever to effect movement of the second die head into the mold chamber, means for introducing a candy body between the die heads, and means for effecting the removal of a molded candy body from the press chamber when the second die head is retracted therefrom.

7. A candy machine of the character stated in claim 6, with a spring bias applied to the pivot fulcrum for each of said levers and yieldingly resisting movement of the lower end of the lever in a direction opposite to that urged by the adjacent cam.

8. In a candy machine of the character stated, a cylindrical candy molding chamber, a pair of cooperating reciprocating die heads supported for movement in said chamber to compress a candy body therein, said chamber having an end open providing an outlet through which the compressed candy body is ejected, a handle stick entrance slot leading into the chamber at the said outlet end, means for supporting a plurality of handle sticks at one side of said slot, an elongate stick guide means aligned with and at right angles to the slot, means for selecting the sticks individually and intermittently and moving the same in a path transversely of their lengths into said guide means, and reciprocating means for engaging each stick after being positioned in said guide means to project the stick lengthwise through the slot and effect the penetration of an end of the stick into a candy body in the chamber.

9. In a candy machine of the character stated including a cylindrical mold chamber and cooperating reciprocating die heads therein for molding a candy body, said mold chamber having an open end providing a molded candy body outlet, a handle stick receiving slot formed in the outlet end of the chamber, a hopper disposed at one side of said slot for supporting a plurality of handle sticks horizontally, a table disposed beneath the hopper, the hopper having an outlet opening directed downwardly toward the table, said table having a stick receiving groove aligned with said slot and offset from the said hopper outlet opening, means for removing the sticks individually and intermittently from the outlet of the hopper for deposit into said groove, means for effecting deposit of a stick in the groove, and a reciprocable thrust member movable in the groove against an end of the stick to force the opposite end of the stick through said slot into a candy body in the mold chamber.

10. In a candy machine of the character stated including a cylindrical mold chamber and cooperating reciprocating die heads therein for molding a candy body, said mold chamber having an open end providing a molded candy body outlet, a handle stick receiving slot formed in the outlet end of the chamber, a hopper disposed at one side of said slot for supporting a plurality of handle sticks horizontally, a table disposed beneath the hopper, the hopper having an outlet opening directed downwardly toward the table, said table having a stick receiving groove aligned with said slot, means for removing the sticks individually and intermittently from the outlet of the hopper for deposit into said groove, means for effecting deposit of a stick in the groove, a reciprocable thrust member movable in the groove against an end of the stick to force the opposite end of the stick through said slot into a candy body in the mold chamber, said means for removing the sticks individually and intermittently from the hopper comprising a slotted plate movable across the face of the table and across the outlet opening of the hopper, the slot of said plate being adapted to pick up one stick from the hopper and move it to position over the table groove, and the said means for effecting deposit of the stick in the groove comprising a pivotally mounted member having a plurality of fingers adapted to engage the top surface of said plate and to pass down into the slot of the plate when said slot moves a candy stick to position over the groove.

11. In a candy machine of the character stated, a cylindrical candy molding chamber, a pair of cooperating reciprocating die heads supported for movement in said chamber to compress a candy body therein, said chamber having an end open providing an outlet through which the compressed candy body is ejected, a handle stick entrance slot leading into the chamber at the said outlet end, means for supporting a plurality of handle sticks at one side of said slot, an elongate stick guide means aligned with and at right angles to the slot, means for selecting the sticks individually and intermittently and moving the same in a path transversely of their lengths into said guide means, reciprocating means for engaging each stick after being positioned in said guide means to project the stick lengthwise through the slot and effect the penetration of an end of the stick into a candy body in the chamber, said guide means being in the form of a groove having the side wall thereof nearest to the outlet end of the chamber in the form of a vertically movable gate, means for lowering the gate following the completion of the compression of the candy body, means movable transversely of the groove for shifting the stick therefrom following the lowering of the gate, and means actuating the stick shifting means.

12. The invention according to claim 11, with an elongate knock-off element supported for swinging movement across the face of a die head when the same has moved out of the molding chamber to knock off a molded candy body stuck to the last mentioned head, and means operatively connected with said knock-off element for swinging the same across the face of the last mentioned head.

13. In a candy machine of the character stated, a cylindrical candy molding chamber, a pair of cooperating reciprocating die heads supported for movement in said chamber to compress a candy body therein, said chamber having an end open providing an outlet through which the compressed candy body is ejected, a handle stick entrance slot leading into the chamber at the said outlet end, means for supporting a plurality of handle sticks at one side of said slot, an elongate stick guide means aligned with and at right angles to the slot, means for selecting the sticks individually and intermittently and moving the same in a path transversely of their lengths into said guide means, reciprocating means for engaging said stick after being positioned in said guide means to project the stick lengthwise through the slot and effect the penetration of an end of the stick into a candy body in the chamber, a molded candy body knock-off stick supported for swinging movement across the face of a die head when the latter has moved out of the molding chamber to knock off a molded candy body stuck to the head, and means operatively connected with said knock-off element for swinging the same.

JAMES M. CARRIS.
CLARENCE L. CRANE.

References Cited in the file of this patent

UNITED STATES PATENTS

| Number | Name | Date |
|---|---|---|
| 1,594,418 | Krout | Aug. 3, 1926 |
| 1,689,879 | Krout | Oct. 30, 1928 |
| 1,692,559 | Miller | Nov. 20, 1928 |
| 2,005,854 | Davis et al. | June 25, 1935 |
| 2,431,489 | Latini | Nov. 25, 1947 |